(12) United States Patent
Orcel et al.

(10) Patent No.: US 6,988,379 B2
(45) Date of Patent: Jan. 24, 2006

(54) METHOD OF MANUFACTURING LARGE CAPACITY PREFORMS BY MCVD

(75) Inventors: Gérard Orcel, Maison Laffitte (FR); Marc Nicolardot, Pierrelaye (FR); Jean-Florent Campion, Conflans St Honorine (FR)

(73) Assignee: Alcatel, Paris (FR)

( * ) Notice: Subject to any disclaimer, the term of this patent is extended or adjusted under 35 U.S.C. 154(b) by 479 days.

(21) Appl. No.: 10/117,228

(22) Filed: Apr. 8, 2002

(65) Prior Publication Data

US 2002/0144521 A1    Oct. 10, 2002

(30) Foreign Application Priority Data

Apr. 9, 2001    (FR) .................................. 01 04789

(51) Int. Cl.
    *C03B 37/018*    (2006.01)
    *C03C 13/04*    (2006.01)
(52) U.S. Cl. ............................. 65/391; 65/397; 65/419; 65/421; 65/436
(58) Field of Classification Search ................. 65/417, 65/419, 421, 436, 391
See application file for complete search history.

(56) References Cited

U.S. PATENT DOCUMENTS 4,061,724 A * 12/1977 Grose et al. ................. 423/705
4,335,934 A * 6/1982 Black et al. ................. 385/127
6,201,917 B1 * 3/2001 Campion et al. ........... 385/123
6,477,864 B2 * 11/2002 Drouart et al. .............. 65/391

FOREIGN PATENT DOCUMENTS

| EP | 0 762 159 A2 | 3/1997 |
| EP | 0 972 752 A1 | 1/2000 |
| WO | WO 00/27767 A1 | 5/2000 |

OTHER PUBLICATIONS

Patent Abstracts of Japan, vol. 13, No. 262, Jun. 16, 1989 & JP 01 065038 A (Sumitomo Electric Ind LTD) Mar. 10, 1989.
Patent Abstracts of Japan, vol. 12, No. 391, Oct. 18, 1988 & JP 63 139028 A (Sumitomo Electric Ind LTD) Jun. 10, 1988.

\* cited by examiner

*Primary Examiner*—Dionne A. Walls
*Assistant Examiner*—Lisa L. Herring
(74) *Attorney, Agent, or Firm*—Sughrue Mion, PLLC

(57) ABSTRACT

The invention provides a low cost method of manufacturing high capacity preforms by chemical vapor deposition. More particularly, there is described a method of manufacturing an optical fiber preform, which method comprises the steps of providing a substrate tube of silica doped with sufficient chlorine to obtain an OH concentration of less than 100 ppb and doped with sufficient fluorine proportional to the chlorine doping to obtain a refractive index that is lower than that of a natural silica, depositing inner cladding and an optical core inside the substrate tube, collapsing the substrate tube to form a primary preform, and depositing outer cladding of said natural silica on the resulting primary preform. The invention is applicable to manufacturing optical fibers.

7 Claims, 1 Drawing Sheet

FIG_1
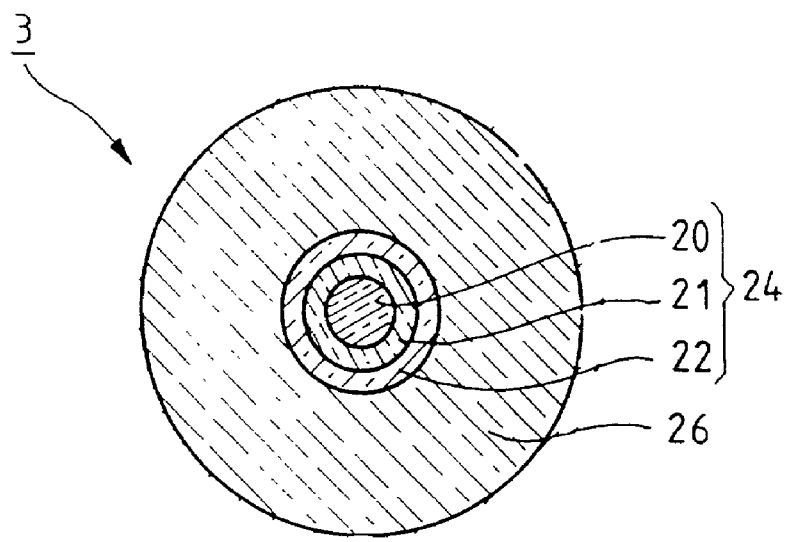
FIG_2
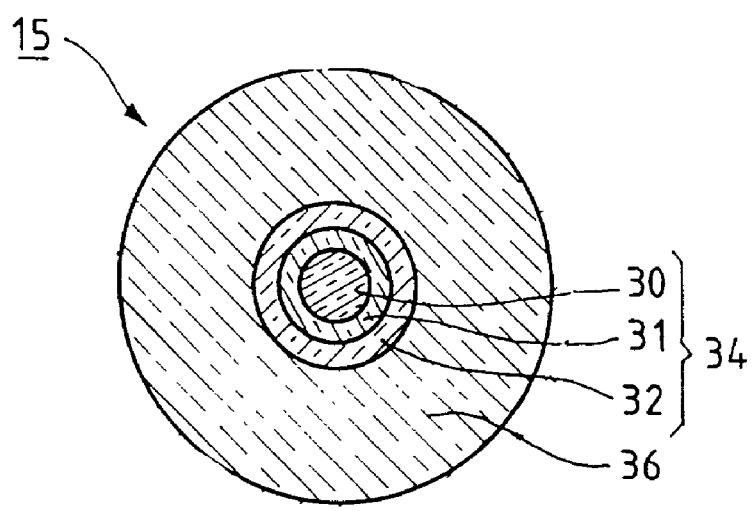

METHOD OF MANUFACTURING LARGE CAPACITY PREFORMS BY MCVD

The invention relates to a method of manufacturing large capacity optical fiber preforms using modified chemical vapor deposition (MCVD) methods.

BACKGROUND OF THE INVENTION

The optical fiber is obtained by proportional hot drawing (fiber drawing), i.e. drawing while maintaining the various different portions of the preform.

Preforms can be obtained by CVD methods such as MCVD or by the vapor axial deposition (VAD) method.

When depositing by MCVD, successive layers of oxide compounds are deposited inside a silica tube referred to as a substrate tube, and they are then vitrified by means of a torch. These layers correspond to the core and to the inner portion of the cladding of the preform. They present a refractive index that varies in compliance with the properties that are desired for the optical fiber.

It is desirable for reasons of keeping down method costs to obtain preforms that are of large capacity. It is also desirable to have optical fibers that are of great length so as to avoid connection losses.

The capacity of a preform is associated with the ratio of the outside radius of the inner cladding to the core radius, also referred to as the b:a ratio. For a given core diameter in the drawn fiber, preform capacity is easier to achieve with small values for the ratio b:a.

The capacity of a preform thus depends on the quantity of core material which can be deposited inside the substrate tube. Unfortunately, when the core is close to the substrate tube, purity requirements for the substrate tube material becomes increasingly strict. It must be of very high purity in order to prevent impurities migrating towards those portions of the fiber that participate in propagating light. Otherwise, propagation properties are observed to be degraded. Thus, it is generally necessary to deposit an "inner" cladding layer inside the substrate tube before depositing the core. However this layer can be very thin if a high purity substrate tube is used.

After the layers corresponding to the core and to the inner cladding have been deposited, the tube is closed up, an operation that is known as "collapsing". This provides a "primary" preform.

The refractive index of the layers corresponding to the core and to the inner cladding is controlled by varying the concentration of chemical dopants.

Thus, germanium is often used to increase the refractive index. Doping using fluorine derivatives or boron compounds serves to reduce the refractive index.

The refractive index can also be affected by other compounds that are present. Thus, phosphorus which is added for the purpose of improving the optical qualities of the fiber also increases its refractive index a little.

The deposition rate of MCVD is limited by the transfer of heat through the substrate tube. In order to optimize conditions for MCVD, substrate tubes are therefore of relatively small thickness. After the tube has been collapsed into a primary preform, the thickness of the tube is increased by depositing outer cladding.

Two different methods are known in particular for depositing outer cladding. In the first method, the primary preform is inserted into a silica jacket of diameter that is slightly greater, and then a second collapsing operation is performed. This method is also referred to as "jacketing".

The second method consists in depositing silica on the primary preform from the outside. This additional outer deposition is also known as building up or out. Such outside deposition can be performed by various methods. An advantageous method is plasma-assisted deposition.

At present, a preform obtained by MCVD can be used to obtain about 250 kilometers (km) of optical fiber from a preform that is 1 meter (m) long. In contrast, preforms obtained by VAD make it possible to obtain more than 400 km of optical fiber per meter of preform.

EP-A-0 972 752 discloses a preform of large size obtained by MCVD. However the outer portion of the optical cladding is obtained by the jacketing method. That technique suffers from the drawback of the very high cost of synthetic silica jackets.

OBJECTS AND SUMMARY OF THE INVENTION

It is desirable to have a method that is less expensive and that makes it possible to obtain large capacity preforms using the MCVD method.

The invention thus provides a method of manufacturing an optical fiber preform, the method comprising the following steps: providing a substrate tube of silica doped with sufficient chlorine to obtain an OH concentration of less than 100 parts per billion (ppb) and doped with sufficient fluorine relative to the chlorine doping to obtain a refractive index that is lower than that of a natural silica; depositing inner cladding and an optical core inside the substrate tube; collapsing the substrate tube to form a primary preform; and depositing outer cladding of said natural silica on the resulting primary preform.

The refractive index of the doped substrate tube is preferably less than that of natural silica by an amount lying in the range $0.25 \times 10^3$ to $1.5 \times 10^{-3}$.

The substrate tube is preferably doped with a mass concentration of fluorine (XF) lying in the range $0.25$ $XCl < XF < 4$ $XCl$.

Advantageously, the resulting preform presents a ratio b:a that is greater than 2. The natural silica used is preferably alpha quartz.

In an implementation of the method, the outer cladding is deposited by plasma-assisted deposition.

The invention also provides a method of manufacturing an optical fiber that includes the step of hot drawing a preform obtained by the invention.

Thus, the problem posed is solved by using a substrate tube for making large capacity preforms in which the substrate tube is of high purity while simultaneously being compatible with an outer cladding of natural silica.

Chlorine doping serves to reduce the presence of OH groups which are responsible for undesirable attenuation of transmission in the optical fiber. However, this doping modifies the refractive index in two ways: firstly by means of a "chemical" effect, and secondly by means of a "physical" effect. The term "chemical" effect means that the index is increased by the very presence of chlorine. The term "physical" effect means that the index is increased due to the appearance of local stresses during fiber drawing. These stresses are associated with a reduction in the softening temperature because of the presence of the chlorine. The viscosity of the substrate tube is lower than that of pure silica.

The use of natural silica for building out serves to reduce the cost of manufacturing preforms considerably. The term "natural" silica is used to mean silica which is not obtained by synthesis, e.g. by decomposing silicon halides. Natural silica is also referred to as "quartz", where reference to "alpha" quartz means the most widespread crystal phase of silica. Natural silica is low in cost but its composition is also slightly different from that of the synthetic silica used for making substrate tubes. As a result the refractive index, the viscosity, and the expansion coefficient of various natural silicas differ from those of the substrate tubes that are presently available.

Thus, a preform obtained using a conventional substrate tube built out by means of natural silica will generally present a refractive index step between the substrate tube and the outer cladding. This index step in the preform is transmitted to the fiber and can indeed be amplified, and in the fiber it leads to optical effects that are undesirable. These effects include, for example, the effect whereby such fibers are observed to be more sensitive to losses due to microbends. The length of the cutoff wavelength can also be affected.

The problem cannot be solved merely by matching the index of the substrate tube to that of the built-out silica. It turns out that doping also has the effect of lowering softening temperature. At the fiber drawing temperature, the substrate tube then presents viscosity which is lower than that of undoped silica, which gives rise to stresses. These stresses cause the refractive index to be increased in the portion of the optical fiber that corresponds to the tube.

In order to solve this problem, the fluorine doping thus takes account simultaneously of the concentration in chlorine and of the index of the natural silica used for building out.

The substrate tubes used present a concentration of OH groups of less than 100 ppb. They thus make it possible to manufacture preforms having a small ratio b:a. This ratio is preferably less than 2.5.

In order to match the refractive index of the substrate tube to that of the natural silica, the substrate tube is doped with a mass concentration (XF) of fluorine that is proportional to the chlorine concentration (XCl) present in the substrate tube. In one embodiment, the mass concentration (XF) of fluorine satisfies the equation $0.25*XCl<XF<4*XCl$. In the presence of other additives (Na, Li, Ge, . . . ) in the tube, the doping concentration (XF) of fluorine can be adapted accordingly.

The increase in the refractive index due to the presence of chlorine is deliberately overcompensated by the fluorine doping so as to accommodate the subsequent increase in index during fiber drawing.

Optical fibers obtained from preforms manufactured using said substrate tubes thus do not present any undesirable index step and are not sensitive to microbending losses. The measured cutoff wavelength is not affected by using natural silica for the outer cladding.

BRIEF DESCRIPTION OF THE DRAWING

The invention will be better understood and other characteristics and advantages will appear on reading the following description, given by way of non-limiting example and with reference to FIGS. 1 and 2.

FIG. 1 is a diagrammatic section view through an optical fiber preform constituting an embodiment of the invention.

FIG. 2 is a diagrammatic section view through an optical fiber obtained from the preform in an embodiment of the invention.

MORE DETAILED DESCRIPTION

A primary preform 24 shown in FIG. 1 is made, for example, using the MCVD method by depositing inner layers based on optionally-doped silica to form an optical core 20 and inner cladding 21 inside a substrate tube 22. In order to manufacture the preform, a substrate tube 22 is used that is made of chlorine-doped silica in order to reduce the presence of OH groups, and that is also doped with fluorine at an equivalent concentration. The mass concentration of fluorine preferably satisfies the following relationship: $0.25*XCl<XF<4*XCl$.

It has been found that the presence of fluorine influences the refractive index of the fiber by two distinct mechanisms. The first mechanism whereby fluorine doping reduces refractive index is purely physical and is associated with the material being modified. The interaction between light and the doped material is modified. This property is made use of when it is desired to obtain a low index, e.g. for fibers having depressed-index inner cladding.

However the refractive index is also affected by other mechanisms. The presence of fluorine lowers the vitreous transition temperature of silica. This results in the substrate tube being put under compression during fiber drawing, and the amount of compression increases with increasing fluorine content. The refractive index of the substrate tube for radially polarized light then tends to rise. Radial polarization is the polarization that is normal for light that propagates axially in a fiber of circular section. The increase in this index itself increases with increasing concentration of fluorine and with increasing fiber drawing tension.

For ordinary fiber drawing tensions (less than 250 grams (g) for a glass fiber having a diameter of 125 micrometers ($\mu$m)), the reduction in index due to the actual presence of fluorine is the effect which predominates. A suitable fluorine content makes it possible to obtain a substrate tube whose refractive index makes it possible to use natural silica for the outer cladding and which presents a low concentration of OH groups.

The substrate tube is made of silica that has been doped with fluorine using one of the conventional methods. Such substrate tubes usually consist of very pure silica, but in addition to the silica and the fluorine they can contain other useful compounds such as oxides of boron, of aluminum, of alkali metals, or of alkaline earths.

After internal deposition, the tube with its inner coating is collapsed so as to transform it into a rod which constitutes the primary preform 24. A built-out preform 3 is made by outer deposition based on natural silica that forms the outer cladding 26 on the primary preform 24. Such outer deposition can be performed in various different ways, e.g. by plasma deposition.

The plasma method can be implemented as follows. Grains of natural silica are deposited by gravity from a feed pipe which is moved in translation parallel to the primary preform 24. The silica grains are fused and then vitrified at a temperature of about 2300° C. by means of the plasma. The building-out operation is performed in a closed cabin so as to provide protection against electromagnetic disturbances and against the ozone that is given off by the plasma torch.

This produces a built-out preform 3 having outer cladding 26.

Drawing such a preform makes it possible industrially to manufacture an optical fiber 15 of great length that possesses good resistance to microbend losses and in which the measured cutoff wavelength is unaffected.

The optical fiber 15 is manufactured by hot drawing starting from the built-out primary preform 3. The fiber drawing tension is preferably regulated on a value lying in the range 10 g to 250 g, and preferably lying in the range 30 g to 150 g. FIG. 2 is a diagrammatic section view through an optical fiber 15 obtained from the preform 3.

There can be seen an optical core 30 and inner cladding 31 forming the portion that transmits the major fraction of the light. Relative to the preform 3 the zone 32 corresponds to the substrate tube 22 and the zone 36 corresponds to the outer cladding 26, while the zone 34 corresponds to the primary preform 24.

Naturally, the invention is not limited to the examples described above. Thus, preforms can have additional extra layers. It is also possible to use other methods for depositing the outer cladding, such as sol-gel methods, impregnation methods, or gas deposition methods.

What is claimed is:

1. A method of manufacturing an optical fiber preform, the method comprising the following steps:

providing a substrate tube of silica doped with sufficient chlorine to obtain an OH concentration of less than 100 ppb and doped with sufficient fluorine relative to the chlorine doping to obtain a refractive index that is lower than that of a natural silica;

depositing inner cladding and an optical core inside the substrate tube;

collapsing the substrate tube to form a primary preform; and depositing outer cladding of said natural silica on the resulting primary preform.

2. A method according to claim 1, in which the substrate tube is doped to have a mass concentration of fluorine lying in the range 0.25 $X_{Cl} < X_F < 4\ X_{Cl}$.

3. A method according to claim 1, in which the resulting preform presents a b:a ratio greater than 2.

4. A method according to claim 1, in which the natural silica is an alpha quartz.

5. A method according to claim 1, in which the refractive index of said doped substrate tube is less than that of the natural silica by an amount lying in the range $0.25 \times 10^{-3}$ to $1.5 \times 10^{-3}$.

6. A method according to claim 1, in which the outer cladding is deposited by plasma-assisted deposition.

7. A method of manufacturing an optical fiber, said method including the step of hot fiber drawing a preform obtained using the method of claim 1.

* * * * *